US007281355B2

(12) United States Patent
Cole

(10) Patent No.: US 7,281,355 B2
(45) Date of Patent: Oct. 16, 2007

(54) INTEGRATED CEILING AND WIREWAY DISTRIBUTION SYSTEM

(75) Inventor: Michael T. Cole, Williamstown, WV (US)

(73) Assignee: The Wiremold Company, West Hartford, CT (US)

( * ) Notice: Subject to any disclaimer, the term of this patent is extended or adjusted under 35 U.S.C. 154(b) by 627 days.

(21) Appl. No.: 10/681,968

(22) Filed: Oct. 9, 2003

(65) Prior Publication Data

US 2004/0128927 A1    Jul. 8, 2004

Related U.S. Application Data

(60) Provisional application No. 60/417,301, filed on Oct. 9, 2002.

(51) Int. Cl.
*E04C 2/54* (2006.01)
*E04B 9/00* (2006.01)

(52) U.S. Cl. .................................. 52/220.6; 52/506.06

(58) Field of Classification Search ............... 506/0.04, 506/0.05, 0.06, 0.07, 0.08, 0.09; 202/0.6, 202/0.7; 309/0.9, 0.11, 0.15; 733/0.1
See application file for complete search history.

(56) References Cited

U.S. PATENT DOCUMENTS

| | | | | |
|---|---|---|---|---|
| 3,848,385 A | * | 11/1974 | Thompson | 52/506.06 |
| 4,189,888 A | * | 2/1980 | Blitzer, Jr. | 52/506.07 |
| 4,280,900 A | * | 7/1981 | Gjesdal | 209/34 |
| 4,540,847 A | * | 9/1985 | Gardner | 174/491 |
| 4,686,381 A | * | 8/1987 | Boteler et al. | 307/147 |
| 5,050,360 A | * | 9/1991 | Gailey | 52/506.06 |
| 5,600,930 A | * | 2/1997 | Drucker | 52/585.1 |
| 5,794,397 A | | 8/1998 | Ludwig | 52/506.08 |

\* cited by examiner

*Primary Examiner*—Anita M. King
(74) *Attorney, Agent, or Firm*—McCormick, Paulding & Huber LLP

(57) ABSTRACT

Ceiling panel assemblies are conventionally suspended from a building structure, and each panel assembly has a core panel provided with dividers and spacers, and panel bridging members to allow cables to be strong in the ceiling as required to accommodate the power and low voltage requirements in the space therebelow. A decorative panel completes each panel assembly. A fire retardant panel may be provided also, to enclose the cables in wireways.

2 Claims, 4 Drawing Sheets

INTEGRATED CEILING AND WIREWAY DISTRIBUTION SYSTEM

CROSS REFERENCE TO RELATED APPLICATIONS

This utility application incorporates by reference and claims priority to a prior provisional application filed in the USPTO on Oct. 9, 2002, assigned Ser. No. 60/417,301.

FIELD OF THE INVENTION

Suspended ceilings generally include a ceiling panel supporting grid that is itself supported by hangers from a rough ceiling above the suspended ceiling. The grid defines rectangular or square openings in which panels are placed to form an aesthetically pleasing surface of uniform horizontal appearance.

In order to provide lighting in the space below the ceiling light troffers are generally provided in the grid. See for example such a light troffer in U.S. Pat. No. 5,794,397.

The necessary wiring for such lighting troffers is generally provided in cable trays above the suspended ceiling and electrical light harnesses are provided between the cable trays and the light troffers. The above-mentioned patent teaches the running of electrical wiring to the light troffers by providing unique suspended ceiling grid rail supports which can themselves define a wireway.

In accordance with the present invention, and to provide additional flexibility for in-ceiling wiring, the ceiling panels themselves are used to define the wire ways for electrical power lines, not only for light fixtures, but also to provide service to the space below the ceiling in general (as for example by power poles or the equivalent).

More particularly the wireways provided for in the suspended ceiling of the present invention accommodate both power lines and data/communication lines. Furthermore these cable are isolated from one another in individual wireways, all in accordance with the present invention.

DETAILED DESCRIPTION OF THE DRAWINGS

Figure 1:
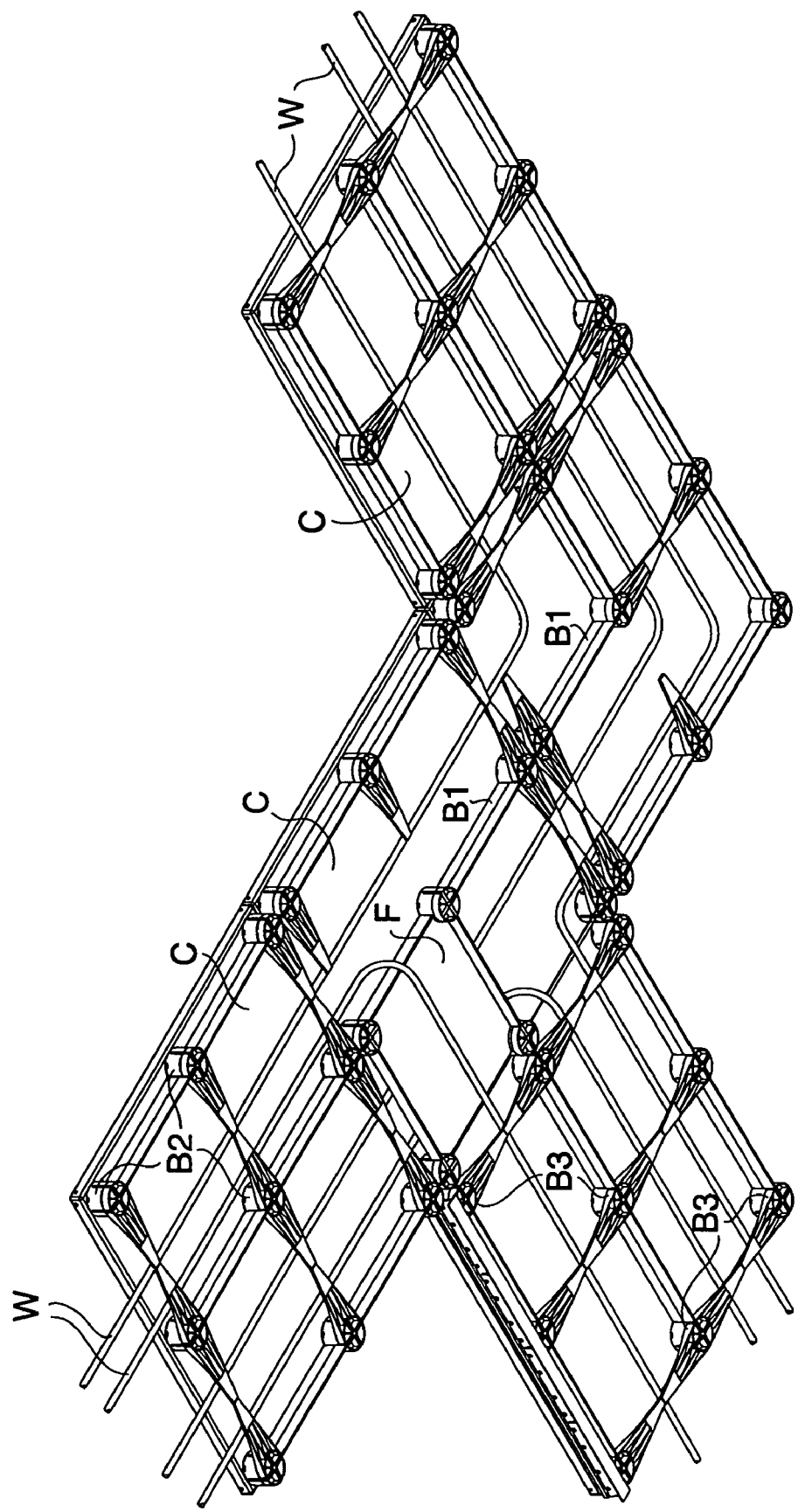
FIG. 1 is a bottom perspective view of selected ceiling panels, with lower portions removed to reveal the wiring distribution system and its support in the panel assembly.

Such a ceiling and wireway distribution system is shown in FIG. 1 as seen from below. Not shown are the decorative panel portions applied to each of the rectangular panel assemblies in the ceiling disclosed in this view.

The grid system is schematically represented by the wires W, W. These wires may themselves support the panel assemblies to be described, or more conventionally can support rails (not shown) that in turn support the panel assemblies.

Figure 2:
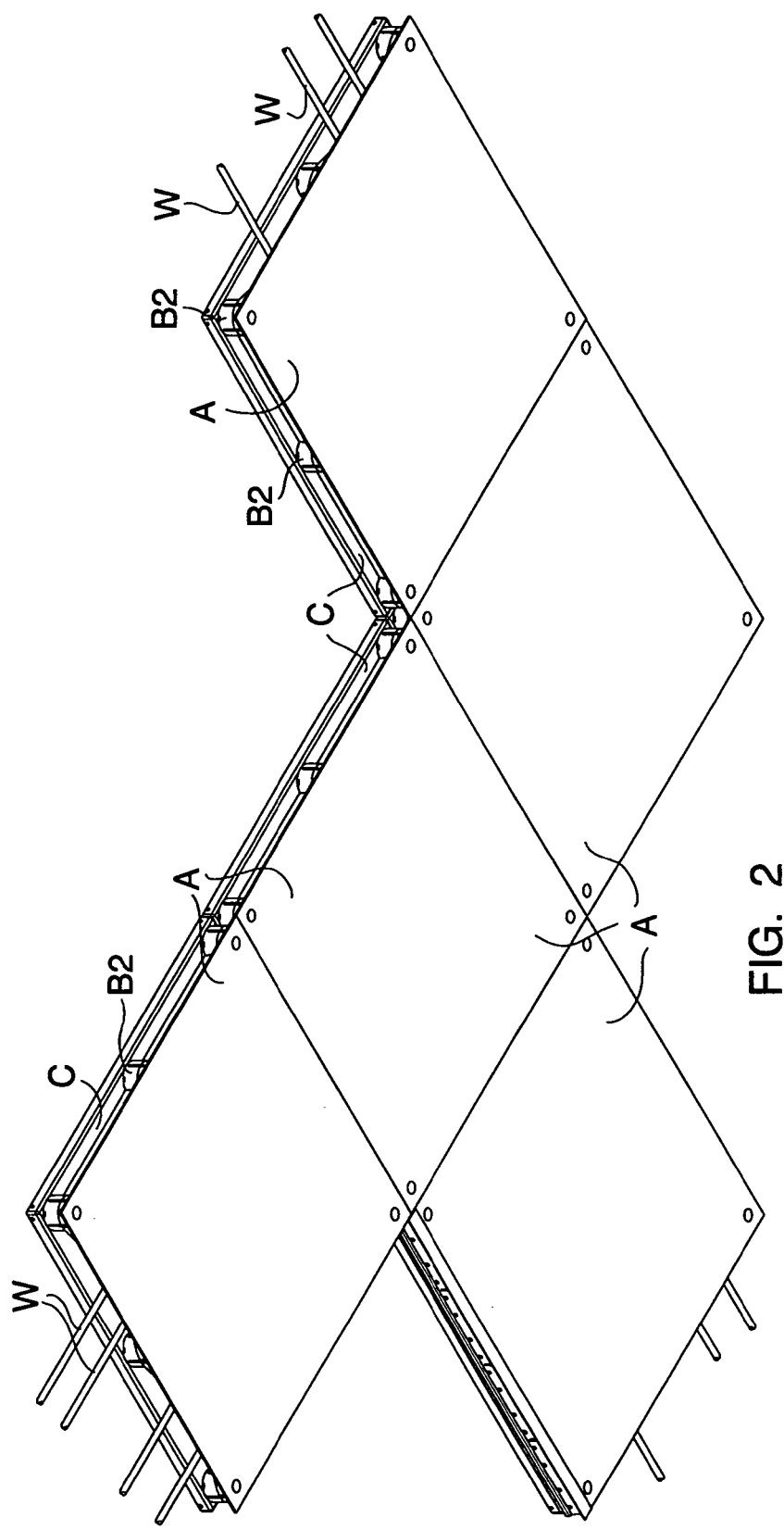
FIG. 2 is a similar to FIG. 1, but with the lower panel portions in place.

FIG. 2 is similar to FIG. 1, and illustrates the ceiling distribution system of the present invention with the decorative panels in place.

Figure 3:
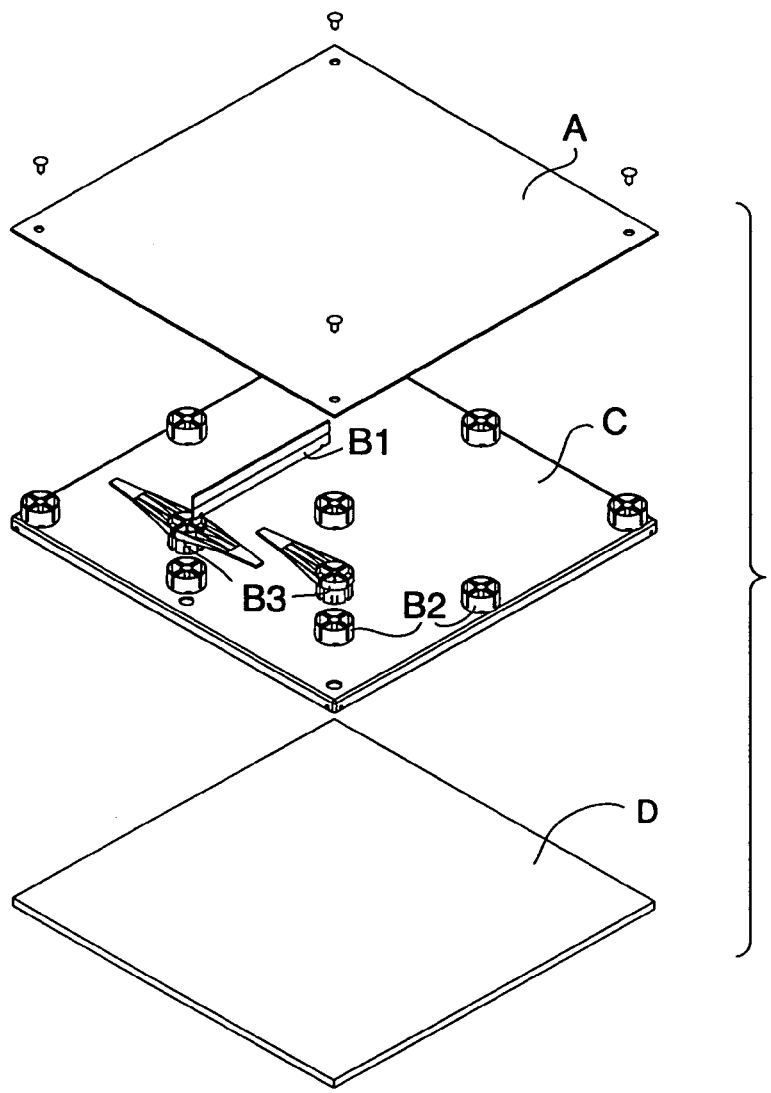
FIG. 3 is an exploded view of the panel assembly.

FIG. 3 shows in exploded relationship, the various components of a typical panel. The lowermost or decorative panel is indicated generally at "A" in FIG. 3, and the divider/spacers are illustrated schematically at "B1", "B2" and "B3" in this view. The spacers and dividers are adapted to be secured to a core panel "C". Finally, a fire retardant foam pad "D" may be applied to the top surface of the core panel "C" in order to afford protection of the building structure from fire.

The panel assemblies are of rectangular or square configuration and include a lower decorative panel, spacers that are adapted to be attached to a center core panel fabricated from a polymeric material such as polyvinylchloride. These core panels and spacers are shown in FIG. 1, and each square panel assembly includes at least three rows of spacers to provide support for the structure. As so configured, the panel assemblies define wireways for the cabling inserted between the spacers and the core panel immediately there above.

The panel assemblies are preferably square in configuration, and at least some panel assemblies include the capability of accommodating cabling. Obviously, not all panels in the ceiling structure will require this capability, but an important feature of the present invention is that all the ceiling panel assemblies be constructed in accordance with the present invention, then the flexibility of the wiring in the space below the ceiling will be greatly enhanced. In short, down wiring can be provided to poles or along divider walls in the space, all is dictated by the needs in the space below. See for example, U.S. Pat. No. 4,686,381 for one example of down wiring.

It will be apparent from FIG. 1 in particular that the dividers and spacers utilized can vary in shape. One feature of the invention is that two spacers B3, B3 used in a particular ceiling panel assembly can span the wire way to be defined thereby, or instead one of these spacers B3 can extend, cantilever fashion part way across the wireway.

The spacers B2, B2 can be used alone where no wiring need be accommodated, and these spacers are designed to be coupled to the wire hangers W, W. The bridging spacers B3, B3 are similar to the smaller cylindrical spacers B2, but have arms extending outwardly to support the cabling as described.

Although not shown in detail, it will be apparent that some panel assemblies adapted for mating with poles that carry power from the ceiling to electronic equipment therebelow, and/or carry data or telecommunication cabling as required. The same is true for bringing the power and data/telecommunication cables into a ceiling distribution system of the present invention. See U.S. Pat. No. 4,230,900 for example. Thus, panel assemblies of the present invention can be used for in-feed units as well as for feeding cables downwardly through conventional power poles. See for example those manufactured by the assignee herein under its TELEPOWER trademark.

Where data/communication wiring is to be run near a parallel power cable, and the need arises to cross one above or below the other, a different configuration for the dividers and spacers can be utilized such that one entire square panel or assembly includes a horizontal divider panel, such as that shown generally at "F" in FIG. 1.

FIG. 3 shows a decorative panel "A" adjacent to the space to be enclosed by the ceiling system of the present invention, and one of a plurality of dividers "B1" which are provided on top of the decorative panel "A' to define wireways or raceways in accordance with the invention. Also shown in FIG. 3 are spacers "B2" and "B3", one form "B2" serving to provide a support for the wire hanger, and the other spacer "B3", providing a bridge with the core panel C and further defining the wireways in the panel assemblies.

The core panel "C" is provided above the spacers and dividers "B1, B2, and B3" further defines the wireways for the cables, both power cables and data/telecommunication cables. So that the cable can be run in the desired direction before installation of the decorative panels A, A.

The spacers "B3" serve to support these cables during installation, and thus allow this installer to see where he can run the cables without having the decorative panels blocking his view of the installation.

Figure 4:
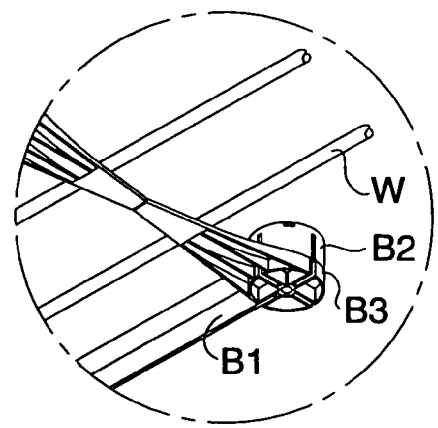
FIG. 4 is a detailed view of the area designated in FIG. 3.

FIG. 4 shows a bridging member "B3" in greater detail and mounted on a wire hanger W of the type described above for supporting the ceiling panels, or the "T" rails that in turn support these ceiling panel assemblies.

The wiring or cables would be placed over the cantilevered arm portion of bridging member B3, and if desired the separator panels B1, B1 can be provided between adjacent members B3 as shown.

Figure 5:
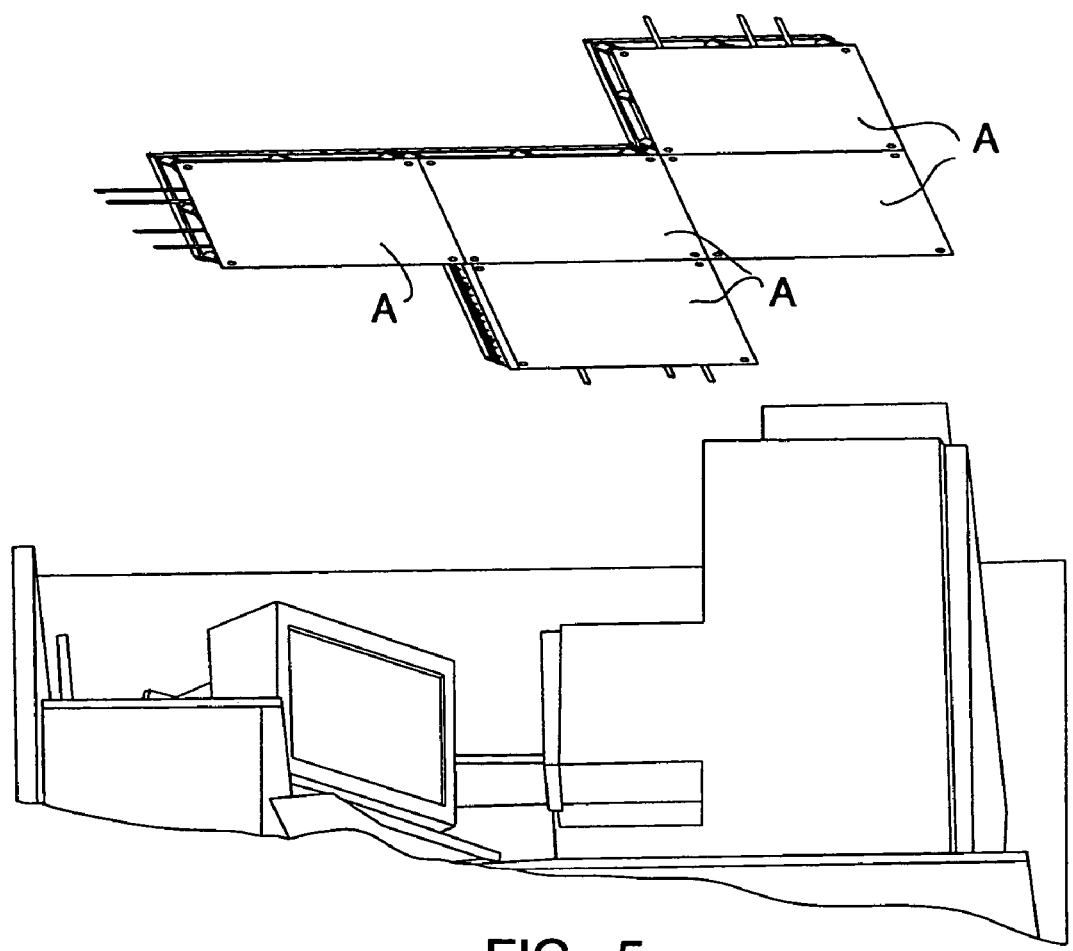
FIG. 5 shows the ceiling panels of FIG. 2 as they would appear from a work station.

FIG. 5 shows the ceiling of FIG. 2, from below as in FIGS. 1, 2 and 3, with an office corral below the partial ceiling to provide a perspective for the ceiling components.

In light of the above disclosure, it is understood that within the scope of the appended claims the invention may be practiced otherwise than as specifically described.

The invention claimed is:

1. An integrated wiring system for a false ceiling comprising:
   a ceiling panel support structure defining an open grid for supporting ceiling panels;
   a plurality of ceiling panel assemblies, each ceiling panel assembly being hollow and including a core panel of rectangular shape and size dictated by the openings of said grid;
   each panel assembly further including depending spacers at the corners of said rectangular core panels;
   some of said spacers further including bridging members that extend across and between adjacent spacers in a panel for supporting wires and cables below said core panel; and
   decorative panels supported from said spacers to further define said hollow panel assembly for the wiring system.

2. The integrated ceiling and wireway system according to claim 1 further including dividers provided between adjacent spacers, said dividers oriented perpendicular to said bridging members whereby separate wireways are provided in said hollow ceiling panel assemblies to isolate high voltage from low voltage wiring.

* * * * *